1,946,344

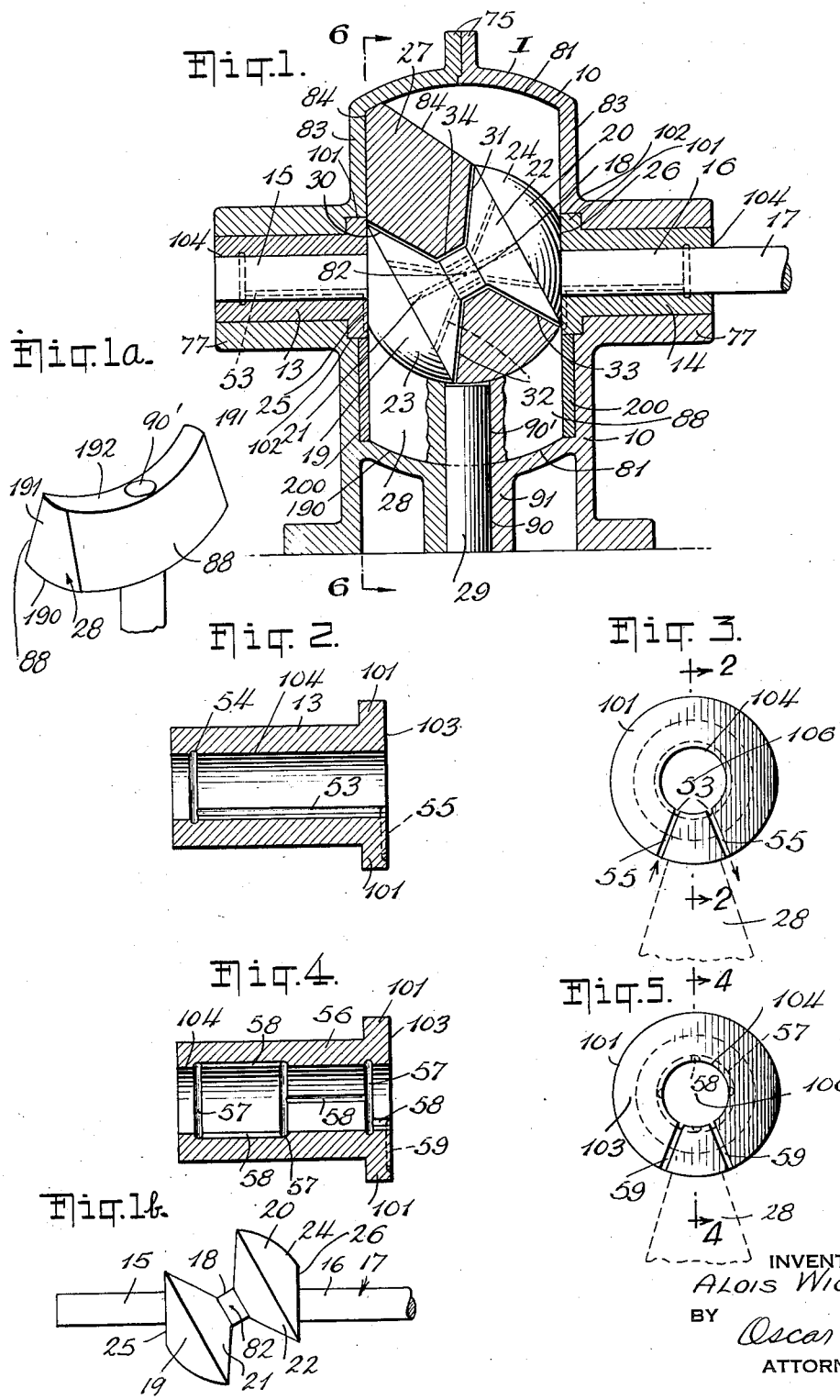
Feb. 6, 1934.      A. WICHA      1,946,344
LUBRICATION SYSTEM
Filed Feb. 13, 1933      3 Sheets-Sheet 1
INVENTOR
ALOIS WICHA
BY Oscar A. Geier
ATTORNEY Feb. 6, 1934. A. WICHA 1,946,344
LUBRICATION SYSTEM
Filed Feb. 13, 1933   3 Sheets-Sheet 2
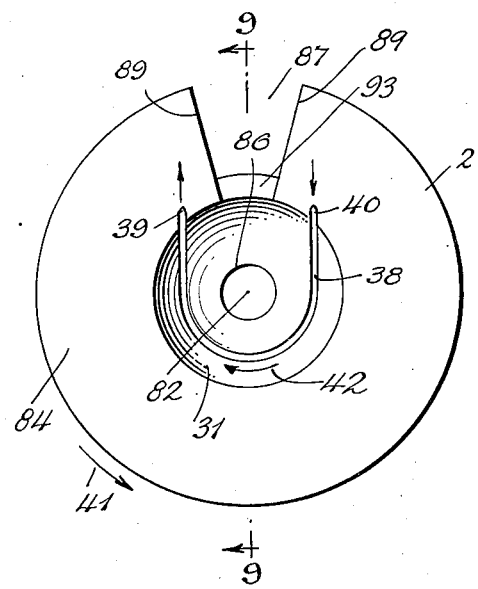
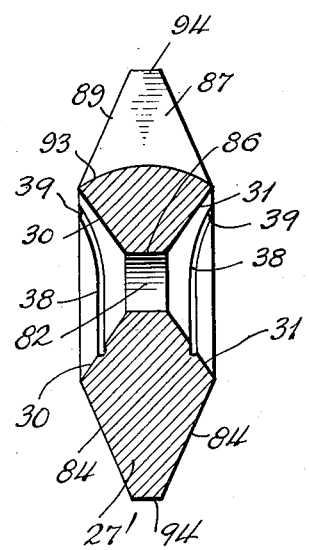
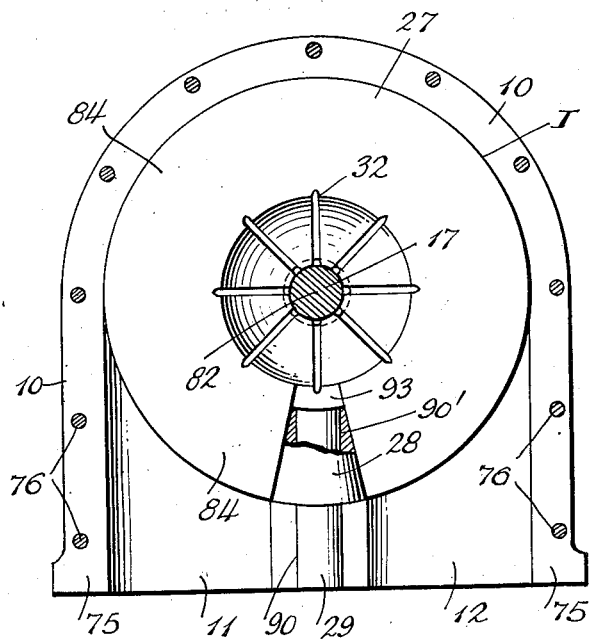
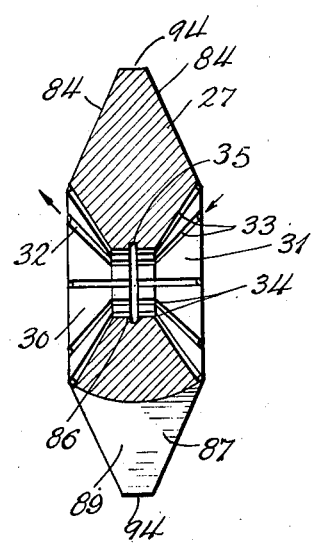
INVENTOR
ALOIS WICHA
BY Oscar A. Geier
ATTORNEY Feb. 6, 1934.  A. WICHA  1,946,344
LUBRICATION SYSTEM
Filed Feb. 13, 1933  3 Sheets-Sheet 3
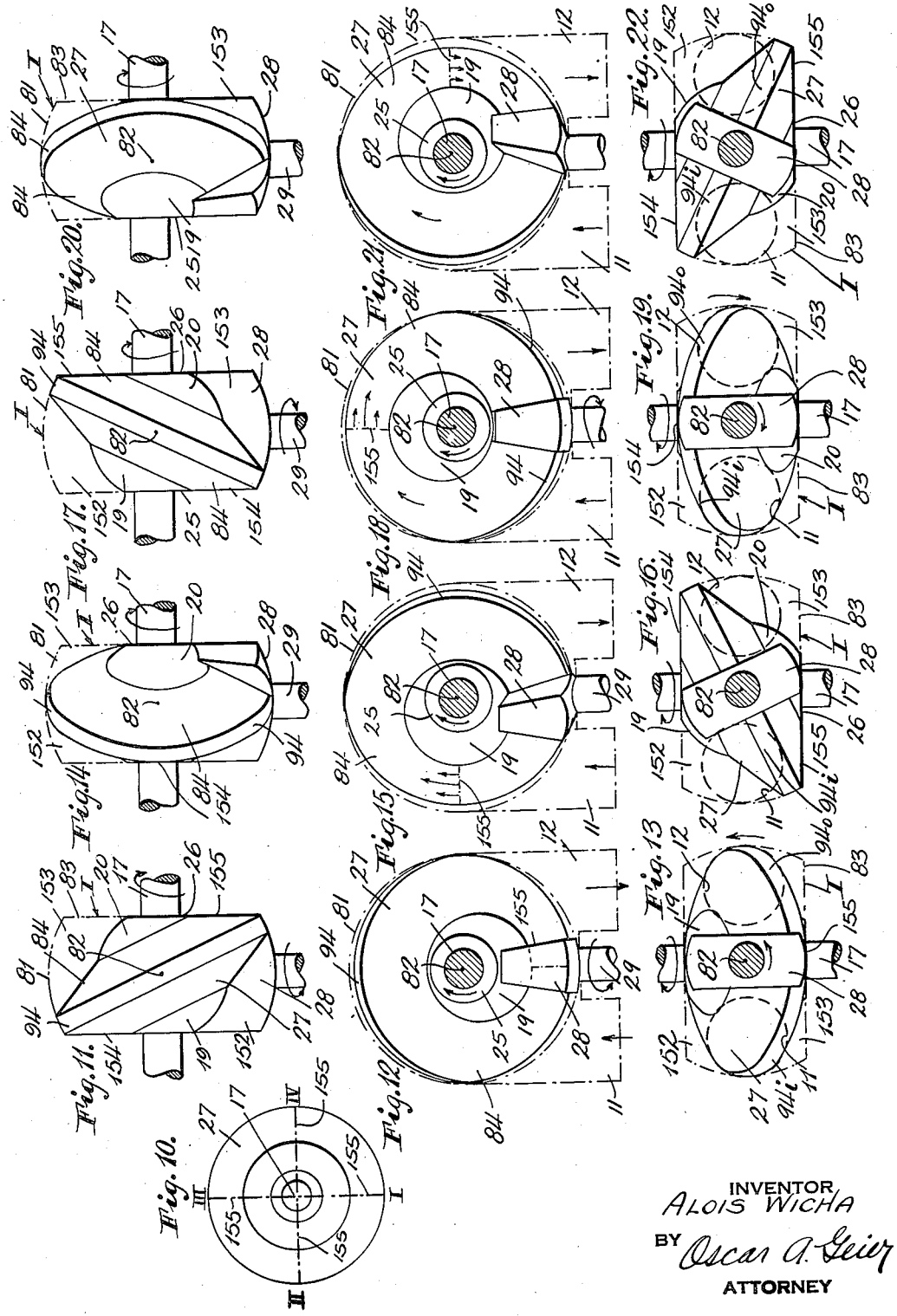
INVENTOR
ALOIS WICHA
BY Oscar A. Geier
ATTORNEY Patented Feb. 6, 1934

UNITED STATES PATENT OFFICE 1,946,344

LUBRICATION SYSTEM

Alois Wicha, Dresden, Germany, assignor to Erospha, Inc., Brooklyn, N. Y., a corporation of New York Application February 13, 1933. Serial No. 656,640

9 Claims. (Cl. 103—133)

This invention relates to fluid actuating devices and particularly relates to pumps for liquids and gases and to compressors for gases and vapors and other similar apparatus.

Although the present invention will be particularly described in connection with liquid pumps it is to be understood that it may be also employed with spherical engines or other similar apparatus where a fluid or liquid is passed into a casing to cause a shaft or a mechanism to be actuated.

An object of the present invention is to provide a spherical engine and particularly a durable pump which may be operated directly from a rotating shaft to give a continuous feed and/or to exert a continuous suction, which will be compact, light in weight and relatively inexpensive and which will have very few parts and not require costly lubricating installations or be readily subject to disadjustments.

Among the other objects of the present invention are to provide a fluid actuator or a pump, which, although it is directly driven from a rotating shaft, has a very high mechanical efficiency and will have a metering action; which may be driven over a wide range of rotational speeds; which will be devoid of valves; which may be readily reversed; and which will produce both a substantially continuous suction at its inlet and a substantially continuous pressure at its outlet, all without the use of complicated or auxiliary mechanical apparatus, such as air bells, resilient diaphragm devices, and so forth.

Other objects will be sufficiently obvious and will appear during the course of the following specification.

In accomplishing the objects above stated the applicant has devised an altogether novel type of pump consisting of a casing, the interior chamber of which may take the form of a spherical section or segment with a peripheral spherical surface and flat or conical side walls; an oscillating impeller disc, the oscillating movement of which takes place both horizontally and vertically within said casing about a fixed center; a drive shaft which has an eccentric driving bearing for the impeller disc causing said impeller to undergo said oscillating movement within the casing resulting in substantially continuous movement of fluid from the inlet to the outlet; and a guide member mounted in said casing and received in a slot or socket in one edge of the impeller disc preventing the impeller disc from rotating while permitting relative pivotal and sliding movement whereby said impeller will partake of said oscillating movement both laterally and vertically.

The impeller disc, the sides of which may be flat or outwardly converging or diverging, always conforms to the spherical interior surface of the interior chamber along its entire periphery and it oppositely approaches the side walls of the chamber, and diametrically oppositely diverges from said walls thereof. As a result the interior chamber will be symmetrically divided into two compartments which will be separated from each other by the impeller. The oscillating movement of the disc will continuously rotate these compartments within the casing.

The guide member is positioned between the inlet and outlet ports of the pump and constructed or associated with other elements, so as to prevent direct communication therebetween. As the compartments pass across the guide member, they will be divided thereby. During this passage they will decrease in volume on the approach or outlet side of the guide member, compressing and/or expelling fluid through the outlet port; and at the same time they will increase in volume on the removal or inlet side of the guide member, sucking fluid in through the inlet port.

The shaft member usually is provided with two bearing portions which are received in openings in opposite sides of the casing.

In the operation of the liquid actuating device considerable friction is caused both at the shaft bearings in the casing and at the bearings between the impeller and the shaft along the eccentric contact surfaces, and it is a particular object of this invention to provide a relatively simple inexpensive construction which will assure satisfactory lubrication of these bearings at all times and which will not necessitate any extra elements nor complicated valved piping arrangements.

Another further object of the present invention is to provide a suitable lubrication installation which may be incorporated as an inherent part of the pump or compressor and which will lubricate the bearings above-mentioned in accordance with their requirements, assuring greater lubrication with greater loads.

In achieving the last-mentioned object of the present invention, it has been found particularly suitable to provide systems of grooves or passageways along the bearing surfaces, the opposite ends of which grooves or passageways will terminate at places within the casing between which there are substantial pressure differentials at all times. The pump compartments which are formed in the interior chamber of the casing by the impeller will contain liquid during operation at different pressure as will also the divided portions of any one compartment as it is passing through due to the decrease in volume on one side of the guide and the increase in volume on the other side of the guide.

The systems of lubricating passageways or grooves may be connected together so liquid will flow therethrough reversely to the direction the liquid is being actuated by the pump. The reverse flowing liquid will return along these grooves and along the frictional surfaces, assuring adequate lubrication. Since the load on the bearing surfaces will increase with the increased pressure differential between the inlet and the outlet of the pump, and since this increased pressure differential will assure an increased flow of the lubricating liquid through grooves or passageways, it is evident that this lubrication will be proportional to the load on the bearings.

The above and other objects of this invention will appear more clearly from the following detailed description when taken in connection with the accompanying drawings showing preferred embodiments of the inventive idea.

In the drawings:

Fig. 1 is a side sectional view of a pump embodying the principles of this invention.

Figs. 1a and 1b are respectively perspective views of the guide member and the shaft removed from the assembly.

Fig. 2 shows a bearing sleeve for the pump shaft in horizontal section, and Fig. 3 is an end view of the bearing sleeve shown in Fig. 2.

Fig. 4 is a view similar to Fig. 2 showing a bearing sleeve provided with lubrication grooves of a modified form, and Fig. 5 is an end view of the bearing sleeve shown in Fig. 4.

Fig. 6 is a side sectional view along the line 6—6 of Fig. 1.

Fig. 7 is a side sectional view through the impeller disc shown in Figs. 1 and 6.

Fig. 8 is a side elevation of an impeller disc provided with lubrication grooves of a modified form, and Fig. 9 is a cross-section along the line 9—9 of Fig. 8, and Figs. 10 to 22 diagrammatically illustrate the operation of the pump during the transfer of the liquid from the inlet to the outlet.

The pump shown in Figs. 1 to 6 of the drawings comprises a casing 10, a main shaft 17, an oscillating impeller disc 27 and a guide member 28.

The casing 10 is formed of two half sections 75 which are bolted together as indicated at 76 in Fig. 6. The interior of the casing takes the form of a spherical section having flat side walls 83 and a peripheral end wall 81 taking the form of a spherical surface. Each of these half sections have corresponding semi-cylindrical openings which coincide where the half sections are bolted together to form the ports 11 and 12, which respectively may be inlet or outlet ports depending upon the direction of rotation.

The casing 10 is provided with the protruding tubular members 77 (see Fig. 1) which receive the bearing elements 13 and 14. These bearing elements receive the cylindrical end portions 15 and 16 of the main shaft 17 (see also Fig. 1b). The shaft 17 drives an oblique eccentric member 18, the center point of which is fixed and coincides with the center point 82 of the casing 10. The ends of the oblique eccentric 18 are connected to the inwardly converging spherical conical elements 19 and 20. The conical surfaces 21 and 22 of these elements are directed toward the center point 82 of the casing.

The impeller disc 27 (see Figs. 1 and 6 to 9) has two outwardly converging truncated conical liquid-impelling surfaces 84, which move over the walls of the casing 83 (as shown in Fig. 1) and is also provided with the inwardly diverging surfaces 30 and 31 which contact with and bear upon the conical surfaces 21 and 22 of the spherical cone members 19 and 20. The impeller also has a central cylindrical opening 86 which bears upon the eccentric oblique element 18 of the shaft 17.

The guide member 28 (see Figs. 1 and 1a) slides in a slot 87 in the edge of the impeller disc 27 and its inwardly converging side walls 88 contact and slide along the side walls 89 of said slot 87. The guide 28 is provided with an opening 90' which receives the inner upper end of a pivot stud 29, while the lower end of the pivot stud 27 is fixed in the opening 90 in the bottom of the casing 10.

The lower surface 190 of the guide 28 is spherical and rotates in contact with the spherical peripheral surface 81 on the interior chamber I of the casing 10, while the end surfaces 191 are cylindrical and bear against the bearing inserts 200 in the side walls 83 of the chamber I. The inner surface 192 of the guide member is also spherical and closely conforms to and slides over the spherical surfaces 23 and 24 of the shaft spherical cone members 19 and 20 and the spherical surface 93 at the bottom of the impeller slot 87.

During rotation of the shaft 17 the guide slot formed by the surfaces 18, 21 and 22 in the shaft 17 and oscillating guide member 28 will cause an oscillating movement of the impeller disc 27.

The operation of the pump is most conveniently shown from the diagrammatic views, Figs. 10 to 22. Fig. 10 diagrammatically illustrates the rotation of the impeller disc 27 and Figs. 11 to 22 show side, front and bottom views of the impeller disc in each of the positions designated in Figure 10, namely I, II, III and IV.

Figs. 11, 12 and 13 are respectively, side, front and bottom views of the impeller disc 27 and guide member 28 in position I; Figs. 14, 15 and 16 are corresponding views in position II; Figs. 17, 18 and 19 are corresponding views in position III; and Figures 20, 21 and 22 are corresponding views in position IV.

As the shaft 17 rotates, the impeller disc 27 will be caused to sweep backwardly and forwardly both horizontally and vertically in the interior chamber I with the result that the impeller disc 27 will partake of a lateral and longitudinal oscillation. At the same time the axes about which the impeller disc tends to swing will also tend to rotate about the fixed common center point 82 of the casing, impeller disc and the shaft. The horizontal axis of the impeller disc 27 will swing in a horizontal plane and the vertical axis will swing in a vertical plane. This last-mentioned vertical plane will rotate or oscillate about the central vertical axis of the casing as indicated in Figs. 13, 16, 19 and 22.

As a result of this movement all points on the periphery of the impeller disc 27 removed from the horizontal axis will tend to move along lemniscate curves which become of greater latitude as the point becomes removed from the center point 82 so that points at the top and bottom of the disc 27 will move in lemniscate curves of maximum amplitude. These curves will lay a spherical surface described upon a radius equal to the distance of the point from the center point 82. Because of this movement no substantial acceleration or deceleration forces will be exerted upon the mass of the impeller disc 27 with the result that the abrupt changes in acceleration of the propelling element characteristic of the reciprocating pump are altogether eliminated.

As indicated in Figs. 11, 12 and 13 respectively, in side, front and bottom views, the impeller disc 27 will divide the interior chamber I of the casing C into two compartments 152 and 153 which are symmetrically disposed on opposite sides of the center point 82. In Figs. 11, 12 and 13 the compartment 153 occupies the upper half of the casing while the compartment 152 occupies the lower half of the casing. In Figs. 14 and 16 the compartment 152 occupies the right side of the casing while the compartment 153 occupies the left side of the casing. In Figs. 17, 18 and 19 the compartment 152 occupies the top side of the casing while the compartment 153 occupies the bottom side of the casing. In Fig. 22 the compartment 152 occupies the right side of the casing while the compartment 153 occupies the left side of the casing.

In Figs. 11, 14, 17 and 22 the compartment 152 will always be to the left and the compartment 153 to the right of the impeller; in Figs. 13, 16, 19 and 22 the compartment 152 is on the upper side and the compartment 153 is on the lower side of the impeller disc 27; and in Figs. 12, 15, 18 and 21 the compartment 152 is to the front and the compartment 153 to the rear of the impeller disc 27.

It is apparent that these compartments due to the oscillation movement of the impeller disc 27, are caused to rotate continuously in the interior chamber I of the casing C.

These compartments 152 and 153 are successively opened and closed to the inlet 11 and then to the outlet 12 so that fluid or liquid which is received through the inlet 11 will be carried to and expelled through the outlet 12. The compartments 152 and 153 will transfer liquid or fluid through the lower half of the casing C from the inlet 11 to the outlet 12. Fluid or liquid communication between the inlet and outlet in the upper half of the chamber I will be prevented by the guide 28.

It will be noted in Figs. 13, 16, 19 and 22 that the compartments 152 and 153 must move through the guide member 28, with the guide member preventing inter-communication between the subdivisions of the compartments.

As shown in Fig. 13 the compartment 152 is moving to the left and is bisected by the guide member 28, while in Fig. 16 both compartments are divided by the guide member 28. In Fig. 19 only the compartment 153 is divided by the guide member 28 and as the compartment 153 moves to the left, its volume increases to the left of the guide 28 and decreases on the right of the guide 28.

As the compartments 152 and 153 move through the guide 28 they first open to the outlet 12. Then the volume of the compartments upon the outlet side of the guide 28 decreases with the result that the liquid or fluid in the compartment is then forced or squeezed out through the outlet 12. At the same time the volume of the compartment on the inlet side of the guide 28 increases with the result that the liquid will be sucked in through the inlet 11 to fill the increasing volume on that side. It will thus be apparent that each compartment 152 and 153 has inlet and outlet subdivisions of changing volume. In the cycle the volume of the compartment is increased while in communication with the inlet, the compartment will be cut off from the inlet after it has been filled; the compartment is opened to the outlet 12; the compartment is decreased in volume while in communication with the outlet until all of the liquid or fluid has then been forced out through said outlet and then the cycle is repeated.

The inlet and outlet subdivisions of each compartment 152 and 153 in addition to being separated by the guide will also be separated by the line or area of convergence between the disc 27 and the side walls 83. This area or line is indicated for the compartment 152 in Figs. 12, 15, 18 and 21 by the dotted line 154. This area or line 154 for the compartment 152, as well as the line or area 155 for the compartment 153 is also indicated in Figs. 13, 14, 19 and 20. The corresponding line or area is indicated at 92 in Figures 11, 16, 17 and 22. The area or line 152 is always directly diametrically opposite to the area or line 154 in respect to the center point 82.

In Figs. 11, 12 and 13 the compartment 152 has achieved its maximum volume and has been just cut off from the inlet 11 by the edge 94$i$ of the impeller disc 27 and is being opened to the outlet 12 by the edge 94$o$ of the impeller disc. The edge 94 of the impeller disc 27 in conjunction with the convergences 154 and 155 serves to valve or to open and cut off the inlet and to open and cut off the outlet in respect to the compartments 152 and 153. In the position shown in Figs. 17 and 19 the line or area 154 coincides with the contact of the end edge of the guide 28 with the wall of the interior I so that the chamber in this position is not divided nor is it decreased in volume by the volume of the guide. To reach this position the compartment 152 has been increased in volume while in communication with the inlet 11 on the inlet side of the guide 28, with the result that an amount of fluid or liquid equal in amount to the maximum volume of the compartment 152 has been sucked or drawn thereinto.

Then as the shaft 17 continues to move from the position III of Figures 17 and 19 to the position IV of Figures 20 and 22, the edge 94$i$ of the impeller disc 27 will swing still farther inwardly from the inlet port to the position indicated in Figure 22, while the edge 94$o$ will sweep outwardly across the outlet port from the position of Fig. 19 to the position of Figure 22, opening the entire outlet port 12 to compartment 152. As this is occurring, the compartment 152 is being moved through the guide 28 so that it is opening to the inlet 11. Liquid or fluid will therefore be sucked into the opening portion of compartment 152 on the inlet side up to the line or area 154 while due to the decreasing volume on the outlet side of the guide 28, a corresponding volume of liquid and fluid will be forced outwardly through said outlet 12.

In the position of Figs. 11 to 13 the compartment 152 will be bisected by the guide 28 and the compartment will open one-half to the inlet 11 and one-half to the outlet 12 with the volume in communication with the inlet increasing while the volume in communication with the outlet is decreasing. In Figs. 14 to 16 the area 154 has reached the outlet port 12. In this position the major portion of the compartment is open in respect to the inlet 11 and with the last portions of liquid contained in said compartment 152 on the outlet side are being forced out through said outlet 12.

It is therefore obvious that as the shaft 17 rotates and the impeller disc 27 and the guide 28 oscillate, liquid or fluid will be continuously acted upon and moved from the inlet 11 to the outlet 12 by the compartments 152 and 153. It will be noted that the pump is substantially volumetric in action except for a small amount of leakage across the periphery 94 and across the lines or areas 154 and 155, the combined volume of the chambers 152 and 153 being transferred from the inlet 11 to the outlet 12 once for each complete revolution of the shaft 17.

Since the subdivisions of the compartments formed within the interior I by the impeller disc 27 will always be increasing or decreasing in volume during rotation of the shaft 17, there will be a constant difference in pressure between the various subdivisions of the same or different compartments. It is this difference of pressure which is utilized in a preferred embodiment for forcing a small amount of the liquid, being actuated by the pump, across the bearing surfaces to lubricate the same.

The bearing surfaces of the pump, which carry the greatest load and which must be assured of lubrication, are those between the impeller disc 27 and the shaft 17. It is to the lubrication of these surfaces that the present invention is specifically directed.

To provide lubrication for the bearing surfaces 30 and 31 of the impeller disc 27, a number of radial grooves 32 and 33 are provided upon said surfaces, as shown in Figs. 1, 6 and 7. The grooves 32 and 33 are connected by the grooves 34 which extend longitudinally across the bearing surface 86 of the impeller disc 27. The center peripheral groove or passage 35 (see Fig. 7) connects the grooves 34.

If the compartment is decreasing in volume at the upper right hand side of the impeller disc 27, due to movement of the edge of the disc toward the wall of the chamber on the right, (looking in the direction of Fig. 7), a part of the liquid in the right pumping compartment will be forced into the upper grooves 33, as indicated. At the same time the impeller disc will be moving away from the opposite side of the chamber I, increasing the volume of the compartment on the upper left hand side with the result that suction will be created on that side of the impeller. This will tend to suck the liquid passing into the groove 33 through the grooves 34 and 32 into such compartment of increasing volume.

In operation, liquid may be forced in through the grooves 33, or liquid may be forced in through the grooves 32 and drawn out through grooves 33.

In the modification shown in Figs. 1, 6 and 7 it is also possible for the lubricating liquid to be actuated by the pump so that it will be drawn in through a groove 33 at one side of the impeller disc and then to pass through grooves 34 and 35 to a groove 33 at the other side of the impeller disc where such groove will be subjected to suction. A similar operation is also possible in the case of grooves 32 on the other side of the impeller disc.

The piston 27' shown in Figs. 8 and 9 is provided with a pair of U-shaped grooves 38 which extend around the bearing surfaces 30 and 31 concentrically of the center point 82. The inlet and outlet ends of the grooves 38 are continued to the inner edges of the converging surfaces 84, as indicated at 39 and 40 in Fig. 8, the openings 39 and 40 of said grooves 38 upon said surface 84 being positioned closely adjacent to and on either side of the guide slot 87.

As is evident, the pumping compartments on one side of the slot 87 will be substantially continually increasing in volume creating a suction, and on the other side of the slot will be decreasing in volume, creating a pressure, with the result that there will be created a difference in pressure between the inlet and outlet ends 39 and 40 of the grooves 38.

As shown in Fig. 8, the pressure compartment or the compartment of decreasing volume will communicate with the inlet end 40 of the groove 38, while the suction compartment or the compartment of increasing volume will be in communication with the outlet end 39 of said groove. As a result, liquid flow will take place through the slot 38 in the direction indicated by the arrow.

The bearings for the shaft bearing elements 15 and 16 may be lubricated in a similar fashion, as indicated in Figs. 1 to 5. The bearing sleeves 13 and 14 which are enclosed in openings in the bosses 77 on the sides of the casing 10 are provided with flanges 101 at their inner ends. These flanges 101 fit into the shoulder portions 102 formed in the interior side walls 83 of the casing 10. The inner faces 103 of these bearing sleeves contact with and bear against the outer flat bearing faces 25 and 26 of the spherical cones 19 and 20 of the shaft. The inside cylindrical bearing surfaces 104 and the end flat bearing surfaces 103 of said sleeves 13 and 14 are provided in Figs. 1, 2 and 3, with a series of communicating grooves 53, 54 and 55, the inlets and outlets of which series are so spaced as to communicate with the pumping compartments inside of the pump interior I so that there will be a difference of pressure causing a flow of liquid through said grooves and along the bearing surfaces 103 and 104.

In Figs. 1, 2 and 3, the cylindrical bearing surface 104 is provided with two longitudinal grooves 53 laterally displaced on either side of the central axis 106 of the shaft 17. A peripheral groove 54 connects the outer ends of the longitudinal grooves 53. Two radial grooves 55 on the bearing surface 103 communicate with the inner ends of the longitudinal grooves 53 and extend to the edge of the flange 101 where they communicate with the pumping compartments within the casing 10, preferably on different sides of the guide 28. Here again, because the pumping compartment is increasing in volume and exerting a suction on one side of the guide 28, while it is decreasing in volume and exerting a pressure on the other side of the guide 28, liquid will be forced in through one of the grooves 55, through a groove 53, around the groove 54, and then out again through the other groove 53 and the other groove 55. The direction of flow is indicated in Fig. 3 when the suction sub-compartment is to the right of the guide 28 and the pressure sub-compartment is to the left of the guide.

A slightly modified system of grooves is shown in Figs. 4 and 5. In this embodiment the inlet and outlet radial grooves 59 on the bearing surface 103 communicate with an arrangement of peripheral grooves 57 and longitudinal grooves 58 on the bearing surface 104. The difference in pressure between the grooves 59 on the opposite sides of the guide 28 will cause liquid to flow through the system of grooves or passageways 57 and 58, assuring satisfactory lubrication of the bearing surface 104.

The greater the pressure exerted by the pump upon the effluent, the greater will be the difference in pressure between the suction and the compression sub-compartments. At the same time a greater amount of lubricating liquid will be forced through the grooves to take care of the increased stress at the bearings. It is thus evident that a very novel lubricating system has been devised which lubricates the bearings in accordance with their needs, increasing the lubrication upon increased loads and decreasing the lubrication upon decreased loads. It is also evident that the grooves as shown may be considerably varied in shape, position and number so as to secure the most satisfactory distribution of the lubrication.

Among the bearing metals which can be satisfactorily lubricated by the arrangements above described are white or Babbit metal, and bronze-graphite composition.

In considering the operation of the fluid actuating device of the present invention, which operation has been diagrammatically illustrated and described in connection with Figs. 10 to 22, it is to be noted that the impeller 27 in the course of its oscillating movement causes a displacement of fluid both when it moves toward the wall of the casing C and when it moves away from the wall of the casing C. In the former case the fluid is forced out of the casing through the outlet or is forced from one part of the interior chamber of the casing to another part of the interior chamber of the casing.

Since the entire side wall or side surface of the impeller does not move toward the side wall of the interior chamber simultaneously but rather is caused to successively move over the side wall of the chamber so that one portion of the side of the impeller is advancing toward the side of the casing, while another portion of the side of the impeller may be moving away from the same side wall of the impeller, it is evident that the oscillating movement of the impeller will result in moving fluid circularly around within the interior of the casing.

It is thus evident that the displacement action of the oscillating impelled of the present invention differs substantially from the displacement action of the piston of a reciprocating pump in that whereas the motion of the reciprocating piston causes a linear movement of fluid to the end of a cylinder, in the device of the present application on the other hand, the displacement action of the impeller causes a rotational movement of the fluid from the inlet to the outlet along the face of the impeller. The guide with its adjuncts extending between the side walls of the chamber I causes the oscillating action to draw in fluid from the inlet and to force fluid out through the outlet.

The volume for containing fluid or liquid within the casing of the device will always be substantially constant since it will be equivalent to the volume of the interior chamber minus the volume of the impeller and the volume of the guide with its adjuncts. As previously described, the impeller will divide the chamber into two symmetrically positioned pumping chambers which, although they are of substantially constant volume throughout operation of the device (except for the volume of the guide or its adjuncts which may project into them) they nevertheless will have portions of varying volumetric capacity in communication with the inlet and outlet, the volume in communication with the inlet increasing while the volume in communication with the outlet is decreasing.

From this point of view is may be considered that the guide is a fixed fluid impelling device which moves relatively through the compartments on opposite sides of the impeller to increase their volume on one side, causing drawing in of liquid from the inlet and to decrease their volume on the other side, causing discharge of liquid through the outlet. This action, however, is quite different from the action of a reciprocating piston pump in which there is a fixed piston and a movable cylinder, in that in the present invention the displacement member or the guide member moves continuously through the compartments, one after the other without the abrupt reversals as occur in all reciprocating pumps.

It is apparent from the foregoing description of the operation, that the shaft may be rotated in either direction, and that as a result of such reverse rotation the inlets and outlets will be similarly reversed. The discharge output of the device is proportional to the speed of rotation of the shaft, while the head or height of delivery is independent of the speed of rotation.

According to the present application an oscillating wall is utilized as a combined guide member for the impeller and a separating wall to prevent direct communication between the inlet and outlet ports of the casing. However, the lubricating arrangements of the present application may be utilized in connection with the impeller, guide member and separating wall constructions disclosed in my copending applications 656,637; 656,638; 656,639; 656,641; 656,642, filed respectively Feb. 13, 1933; 673,244 and 673,245 filed May 27, 1933; and 696,944, filed Nov. 7, 1933.

The copending applications 656,637; 656,641 and 696,944 disclose the utilization of diverging impellers positioned in chambers provided with fixed or rotatable side walls. These applications also disclose the utilization of fixed separating walls with which may be combined conical or cylindrical guide members fitting in a socket in a slot in the impeller which is also provided with a slot to receive and slide across said separating wall. If desired, the conical guide may be fixed along the vertical axis of the casing and provided with wings extending from said conical guide toward said side walls, as disclosed in applications 656,637 and 656,641.

The copending applications 673,244 and 673,245 are respectively directed to constructions in which the guide member is substantially separated from the fixed separating wall and is made in the form of a ball or in the form of a double fin or pin sliding in cross grooves in the impeller structure and in the casing structure. The copending application 696,944 is directed to the provision of surface or space packing or sealing between the periphery and side of the impeller and periphery and side of the interior chamber of the device.

The copending applications 656,638 and 656,642 are respectively directed to the application of the fluid actuator of the present application to gas compressors and/or to vacuum pumps.

What is claimed is:

1. In a fluid actuating apparatus, a casing with an interior spherical pumping chamber with inlet and outlet ports, said chamber being provided with spaced side walls and with a continuous spherical peripheral wall connecting said side walls, an impeller provided with a spherical peripheral edge located in close adjuxtaposition to said spherical peripheral wall of the chamber and with side walls oppositely contacting and diverging from the side walls of said chamber and thereby dividing said chamber into a plurality of compartments, a rotatable driving shaft provided with an oblique groove receiving said impeller, and a guide member preventing rotation of said impeller while permitting it to oscillate to rotate said compartments, whereby it will convey fluid from said inlet port to said outlet port, the contacting surfaces between said impeller and said groove being provided with at least two interconnected grooves opening on opposite sides of the impeller for the circulation of a lubricant.

2. In a fluid actuating apparatus, a casing with an interior spherical pumping chamber with inlet and outlet ports, said chamber being provided with spaced side walls and with a continuous spherical peripheral wall connecting said side walls, an impeller provided with a spherical peripheral edge located in close adjuxtaposition to said spherical peripheral wall of the chamber and with side walls oppositely contacting and diverging from the side walls of said chamber and thereby dividing said chamber into a plurality of compartments, a rotatable driving shaft provided with an oblique groove receiving said impeller, and a guide member preventing rotation of said impeller while permitting it to oscillate to rotate said compartments, whereby it will convey fluid from said inlet port to said outlet port, the contacting surfaces between said impeller and said groove being provided with at least two interconnected and radially extending grooves opening on opposite sides of the impeller for the circulation of a lubricant.

3. In a fluid actuating apparatus, a casing with an interior spherical pumping chamber with inlet and outlet ports, said chamber being provided with spaced side walls and with a continuous spherical peripheral wall connecting said side walls, an impeller provided with a spherical peripheral edge located in close adjuxtaposition to said spherical peripheral wall of the chamber and with side walls oppositely contacting and diverging from the side walls of said chamber and thereby dividing said chamber into a plurality of compartments, a rotatable driving shaft provided with an oblique groove receiving said impeller, and a guide member preventing rotation of said impeller while permitting it to oscillate to rotate said compartments, whereby it will convey fluid from said inlet port to said outer port, the contacting surfaces between said impeller and said groove being provided with U-shaped grooves opening on opposite sides of said guide.

4. In a fluid actuating device, a casing having an interior fluid receiving chamber with spaced sides and spherical peripheral surfaces, said chamber being provided with inlet and outlet ports, an impeller located within said chamber having a peripheral spherical outside surface located in close adjuxtaposition to the peripheral surface of the chamber and having fluid actuating side walls which oppositely approach and diverge from the sides of the chamber so as to form semi-circular wedge-like fluid conveying compartments to be rotated from the inlet to the outlet ports, separating means in said casing transversely located between the inlet and outlet ports through which said compartments are caused to pass, said separating means preventing direct communication between the inlet and outlet ports, said rotation causing a movement of fluid from the inlet port into the outlet port through the chamber, said impeller being provided with a transverse opening to receive said means, and a central oblique cam element for cooperating with said impeller, holding it in relatively oblique position within said chamber and for causing the side walls of said impeller and the sides of the chamber to move relatively over one another within said chamber and to cause the peripheral outside surfaces of the impeller to oscillate relatively laterally across said chamber, said oblique cam element having a sliding bearing in respect to said impeller, and lubricating passage-ways extending along said bearing between opposite sides of said separating means whereby fluid will be forced through said lubricating passage-ways by the differences in pressure on opposite sides of said separating means reversely to the flow of fluid from the inlet to the outlet ports through the casing.

5. In a fluid actuating device, a casing having a fluid actuating chamber with spaced sides and spherical peripheral surfaces, said chamber being provided with inlet and outlet ports, and being provided with a central shaft connection, an impeller member located obliquely across said chamber having diametrically opposite converging portions and divergent portions so as to form a plurality of reversely congruent semicircular wedge-like actuating compartments, the outside portion of said impeller having spherical surface located in close adjuxtaposition to the spherical surface of the chamber, a transverse separating means between said inlet and outlet ports received in a slot in said impeller, through which said compartments are caused to pass upon operation to increase in volume in communication with the inlet port and to decrease in volume in communication with the outlet port, said shaft carrying a central cam element cooperating with said impeller to hold it in relatively oblique position within said chamber and to cause its side walls and the sides of the chamber to move relatively past one another and the spherical outside surface of the impeller to oscillate relatively laterally across said spherical peripheral surface, said oblique cam element having a sliding bearing in respect to said impeller and lubricating passage-ways extending along said bearing between opposite sides of said separating means, whereby fluid will be forced through said lubricating passage-ways by the differences in pressure on opposite sides of said separating means reversely to the flow of fluid from the inlet to the outlet ports through the casing.

6. In a fluid actuating apparatus, a casing, with an interior spherical chamber having spaced side walls, a spherical peripheral wall, and inlet and outlet ports opening in one side of said spherical peripheral wall and positioned closely adjacent to each other, a disc-like impeller positioned obliquely in said chamber having side walls which converge toward diametrically opposite points on the chamber side walls and having its side walls at other points diverging from the side walls of the chamber to form reversely congruent compartments, a central cam element to actuate said impeller and a guide element to control the motion of said impeller, said guide element fitting in a slot in said impeller and said impeller fitting in a slot in said central cam element, the contacting sliding surfaces of said slots converging toward the center point of the apparatus, the contacting sliding surfaces between the central cam element and the impeller being provided with lubricant passage-ways extending across said surfaces from adjacent the outlet to adjacent the inlet ports and from one side of said guide element to the other side of said guide element whereby fluid will be forced through said passage-ways to lubricate said passages by the differences in pressure on opposite sides of said guides.

7. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of said impeller while permitting it to oscillate to rotate said compartments, whereby it will convey fluid from said inlet port to said outlet port, said slot having complemental conical bearing surfaces opposed to each other, and said impeller having similar surfaces engaging the first-named surfaces, the engaging surfaces of said impeller being provided with distributing grooves extending from one side of said guide member to the other side of said guide member whereby the difference in pressure between said inlet and said outlet ports will cause a flow of lubricating fluid therethrough reversely of the direction to which it flows through the casing.

8. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of impeller while permitting it to oscillate to rotate said compartments, whereby it will convey fluid from said inlet port to said outlet port, said slot having complemental conical bearing surfaces opposed to each other, and said impeller having similar surfaces engaging the first-named surfaces, said bearing surfaces converging toward a common point which is coincident with the axis of rotation of said shaft, the convergent bearing surfaces of said impeller being provided with U-shaped grooves extending between opposite sides of said guide member whereby fluid will be caused to pass therethrough from adjacent the outlet port to adjacent the inlet port reversely of its flow through the chamber under the actuation of the impeller and whereby lubrication of such surface will be attained.

9. In a fluid actuating apparatus, a casing with an interior spherical pumping chamber with inlet and outlet ports, an impeller dividing said chamber into a plurality of compartments, a rotatable driving shaft provided with an oblique slot receiving said impeller, and a guide member preventing rotation of impeller while permitting it to oscillate to rotate said compartments, whereby it will convey fluid from said inlet port to said outlet port, said slot having complemental conical bearing surfaces opposed to each other, and said impeller having similar surfaces engaging the first-named surfaces, said bearing surfaces converging toward a common point which is coincident with the axis of rotation of said shaft, the converging surfaces of said impeller being provided with a plurality of interconnected convergent grooves which will open on opposite sides of said guide member whereby lubricating fluid is caused to pass through said grooves from the portion of the chamber adjacent the outlet port to the portion of the chamber adjacent the inlet port, assuring lubrication of the converging portions.

ALOIS WICHA.